United States Patent
Olin et al.

[11] 3,977,163
[45] Aug. 31, 1976

[54] MOWER-HEIGHT-OF-CUT ADJUSTMENT MECHANISM

[75] Inventors: Paul H. Olin, Bloomington; Allen D. Mathison, New Hope, both of Minn.

[73] Assignee: The Toro Company, Minneapolis, Minn.

[22] Filed: July 14, 1975

[21] Appl. No.: 595,608

[52] U.S. Cl. ........................... 56/7; 56/17.2; 56/249
[51] Int. Cl.² ........................... A01D 75/30
[58] Field of Search ........... 56/7, 17.2, 17.1, 249; 172/668; 280/9, 43

[56] References Cited
UNITED STATES PATENTS

| | | |
|---|---|---|
| 3,524,309 | 8/1970 | Bartlett .............................. 56/249 |
| 3,599,406 | 8/1971 | Akgulian .............................. 56/17.2 |
| 3,824,772 | 7/1974 | Sorenson et al. .......................... 56/7 |

*Primary Examiner*—Robert Peshock
*Assistant Examiner*—James D. Hamilton
*Attorney, Agent, or Firm*—Merchant, Gould, Smith, Edell, Welter & Schmidt

[57] ABSTRACT

A height-of-cut adjustment mechanism for use with a lawn mowing machine in which the cutting mechanism is supported by a pair of ground engaging rollers. The mechanism provides rapid and repeatable two position adjustment by means of a spring biased trigger mechanism controlling the position of pivot arms connected to one of the ground engaging rollers.

11 Claims, 6 Drawing Figures

MOWER-HEIGHT-OF-CUT ADJUSTMENT MECHANISM

BACKGROUND OF THE INVENTION

This invention relates generally to lawn mowing machines and more particularly concerns a rapid height-of-cut adjustment mechanism for lawn mowing machines. It is well known that the height-of-cut of mowing machines used, for example, to cut grass greens on golf courses, must be precisely controlled. In addition, it is customary to surround a golf course green with a collar or "froghair" cut at a slightly higher level as a transition portion, for the purpose of chipping and to vary the shots required of the golfer. To deal with this problem, a number of alternative mechanisms and methods have been used to cut the green and collar portions.

Often, separate mowers with separate height-of-cut settings will be used for the purpose of greens cutting and collar cutting applications. This results in substantial additional expense due to required duplication of machines and problems in transporting more than one machine to provide the greens cutting and trimming function.

Alternative rapid height-of-cut adjustment in the prior art is shown in U.S. Pat. No. 3,524,309 to Bartlett and U.S. Pat. No. 3,824,772 to Sorenson. In the Bartlett patent the height-of-cut adjustment is achieved by moving a ground engaging roller into contact with a two position stop. The switching is accomplished through a bell crank lever system. The Sorenson patent teaches use of alternative ground engaging rollers adjusted for the two positions. During operation of the lower roller setting the other roller is swung upward and out of ground contact.

Common drawbacks of prior art devices are that they are either difficult to actuate or do not provide precise adjustment with compensation for wear in the adjustment mechanism over the life of the cutting unit.

The present invention overcomes these difficulties by providing an easily actuated spring biased height-of-cut adjustment mechanism in which the spring biasing not only provides the triggering force to change from one setting to another but also takes up wear in the system and protects against wear caused by raising and lowering cutting units since the spring upwardly biases the pivot arms which carry the adjustable ground engaging roller.

SUMMARY OF THE INVENTION

In accordance with the invention, a height-of-cut adjustment mechanism for use with a reel-type mower assembly having a cutting unit mounted in a frame to be supported by at least one ground engaging rolling member is provided. The mechanism includes at least one pivot arm which is pivotally carried by the frame and provides a supportive connection between the rolling member and the frame to permit adjustment of the height of the frame relative to the ground engaging rolling member. Means having a stop surface positioned to limit pivotal travel of the pivot arm are provided. In addition, trigger means are provided which operate in a first position to provide a second stop surface for contact to further limit the travel of the pivot arm, and in a second position, to permit the pivot arm to travel to contact the first stop surface. A resilient element such as a spring is provided both for urging the pivot arm to pivot in the direction towards contact with the first stop surface and to urge the trigger means towards the first position. Latch means are also provided which prevent the trigger means from operating while the pivot arm means is in contact with the first stop surface.

Due to such structure the pivot arm is continuously biased against a stop surface and does not shift when the reel assembly is lifted from a ground engagement position to a position above the ground, thus lessening wear. Also, since the pivot arm which carries the roller is continually spring biased against a stop surface, wear in the adjustment mechanism may be taken up by the spring.

In a particular class of embodiments of the invention, the spring means comprises a compression spring which tends to draw the pivot arm upward toward the first stop surface. The trigger means includes a pivot block element and the compression spring also acts to spring bias the pivot block toward the first position. The pivot block carries a protrusion providing the second stop surface which extends below the first stop surface for contact with the pivot arm. A relief hole in the pivot arm allows height-of-cut adjustment to be accomplished by manual pivoting of the arm against the spring biasing force until the protrusion extends into the clearance hole in the pivot arm. The protrusion then bears against the hole in the pivot arm, which functions as a latch to prevent the compression spring from urging the trigger means back into the first position.

BRIEF DESCRIPTION OF THE DRAWINGS

Other objects and advantages of the invention will become apparent upon reading the following detailed description and upon reference to the drawings, in which.

While the invention will be described in connection with preferred embodiments, the invention is not limited in scope to those embodiments. On the contrary, all alternatives, modifications and equivalents included within the spirit and scope of the invention as defined by the appended claims are covered.

DETAILED DESCRIPTION OF THE INVENTION

Figure 1:
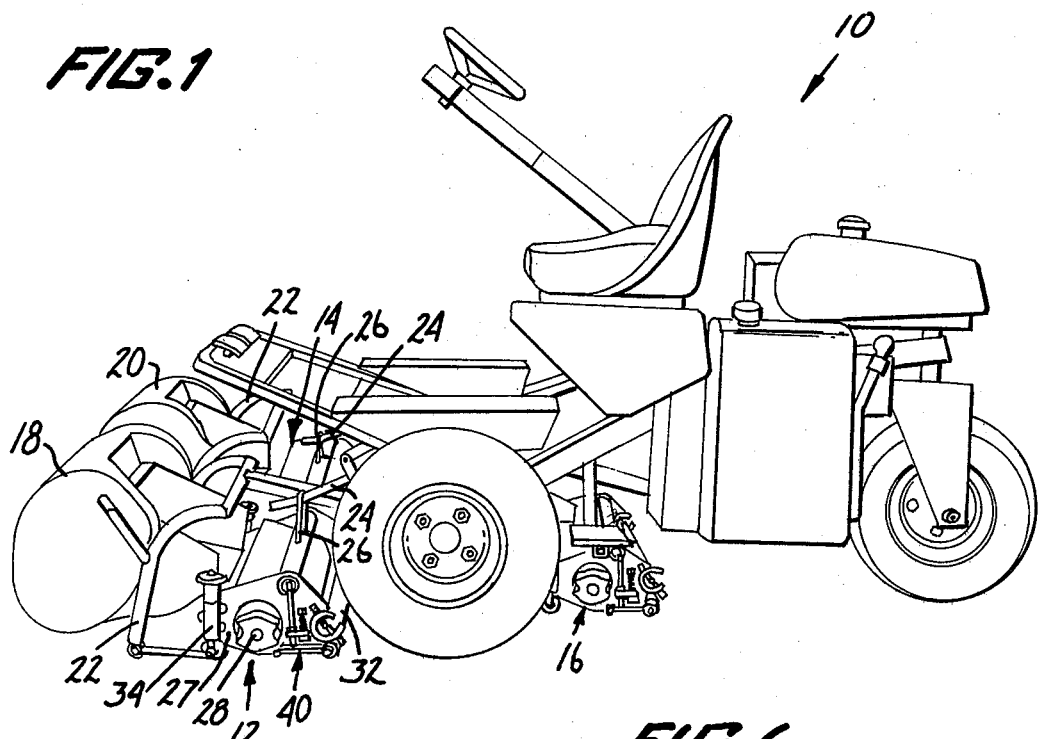
FIG. 1 is a perspective view of a greens-type mower of the type which might incorporate the present invention, showing three reel assemblies on which the height-of-cut adjustment mechanism of the present invention is used.

In the drawings, the use of like reference numerals throughout the several views indicates like elements. Shown in FIG. 1 is a greens-type lawn mower 10 of the type on which the present invention might be used. While it will be understood that the invention is not limited to application with such a mower, FIG. 1 is provided to illustrate and aid in understanding of the operation and advantages of the invention in a specific environment. The greens-type mower 10 is a tricycle vehicle having three reel assemblies generally designated 12, 14 and 16. Only a portion of reel assembly 14 is visible in view of FIG. 1. Mower 10 further includes grass baskets 18 and 20 which function to collect grass cut by reel assemblies 12, 14, 16. Attached to the tricycle prime mover portion of the mower 10 and providing drawing force to the reel assemblies are drawing linkages 22, 22 shown for assemblies 12 and 14, but in the case of reel assembly 16 obscured by one of the wheels of the vehicle. Linkages 22 provide individual suspension to each of the reel assemblies during their cutting mode when the assemblies are ground-engaged.

When desired an operator of mower 10 may raise reel assemblies 12, 14, 16 from ground-engagement, as for example, when the mower leaves a green area and is turning prior to cutting another swath across the green. In the case of mower 10, the reel assembly lift function is provided by a hydraulic lift mechanism of the mower having lift arms 24, 24 shown for reel assemblies 12 and 14. A similar lift arm is used in the case of reel assembly 16. Lift arms. 24, 24 extend through lift bails 26, 26 rigidly attached to each reel assembly.

Each of the three reel assemblies 12, 14, 16 is similar in construction to each other reel assembly, so only one will be described in detail. Reel assembly 12 includes a frame 27 in which a cutting reel is mounted for rotation about an axis defined by shaft 28. In conventional fashion, the reel operates against a fixed bed knife to cut upstanding blades of grass. Reel assembly 12 is provided with front and rear ground engaging rolling members 30 and 32 respectively. While rollers are typically used and are shown in the embodiments described in detail in this specification, any form of ground contact member which would not harm the surface to be mowed and provides a well defined area of engagement between the ground and the mowers would be sufficient. As alternatives, small wheels or possibly even skids might be used.

Front and rear ground-engaging rollers 30 and 32 establish a plane of ground-engagement which defines the height-of-cut of reel assembly 12. Therefore, any downward or upward movement of either rolling member with respect to the frame defines a new height-of-cut for the reel assembly. As shown particularly in FIG. 1, front rolling member 30 has adjustment mechanisms 34, 34 located at opposite ends thereof. Each end of roller 30 is carried on a vertically adjustable rod which is screw threaded through a member rigidly attached to the frame. This provides a fine adjustment of the height of the front roller 30. Rear roller 32 is provided with a height-of-cut mechanism constructed according to one embodiment of the present invention. In the embodiment shown in FIG. 1 it is contemplated that an adjustment mechanism 40 will be located at each end of the roller. Alternatively, it may be possible to use only one such mechanism and to provide an idler or other means of supporting the opposite end of the roller. The importance of the present invention is the manner in which it provides the capability of precise and repeatable two position adjustment of the ground-engaging member.

FIGS. 2 through 6 show the height-of-cut adjustment mechanism in more detail. Mechanism 40 is fastened to frame 27 by means of a pair of machine screws 42 which extend through clearance holes in frame 27 and threadedly engage a mechanism mounting plate 44. Mechanism mounting plate 44 has a pivot pin 46 affixed thereto and extending in a generally horizontal direction outward from plate 44. Pivot pin 46 defines a pivot axis for pivot arm means 50 which extends rearwardly from pivot pin 46 as shown particularly in FIGS. 2 and 3. Pivot arm means 50 includes a cylindrical bearing 52 having a grease fitting 54 thereon to permit lubrication of the pivot point. Pivot pin 46 may be threaded to receive a lock nut 56 which retains the pivot arm means 50 in position on the pivot pin. Welded to the cylindrical bearing portion 52 is an elongated right angle portion 58. Right angle portion 58 may be welded or attached to the cylindrical pivot bearing 52 by other suitable means. The end of right angle portion 58 opposite bearing portion 52 carries a cylindrical roller shaft receiving portion 60. Suitable means for fastening the roller shaft within portion 60, such as a set screw 62, may be provided.

Figure 2:
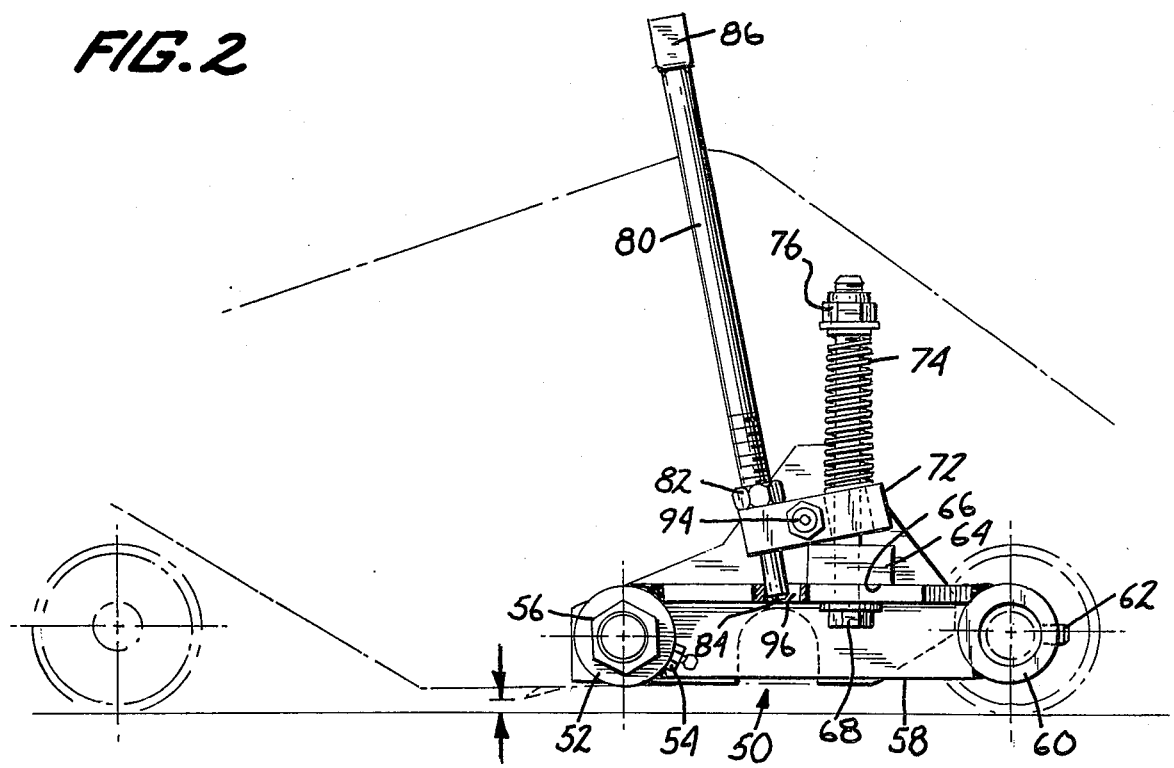
FIG. 2 is a side elevational view of a preferred embodiment of the height-of-cut adjustment mechanism of the present invention with sufficient detail of the associated reel assembly being shown to illustrate the operation of the height-of-cut adjustment mechanism.
Figure 3:
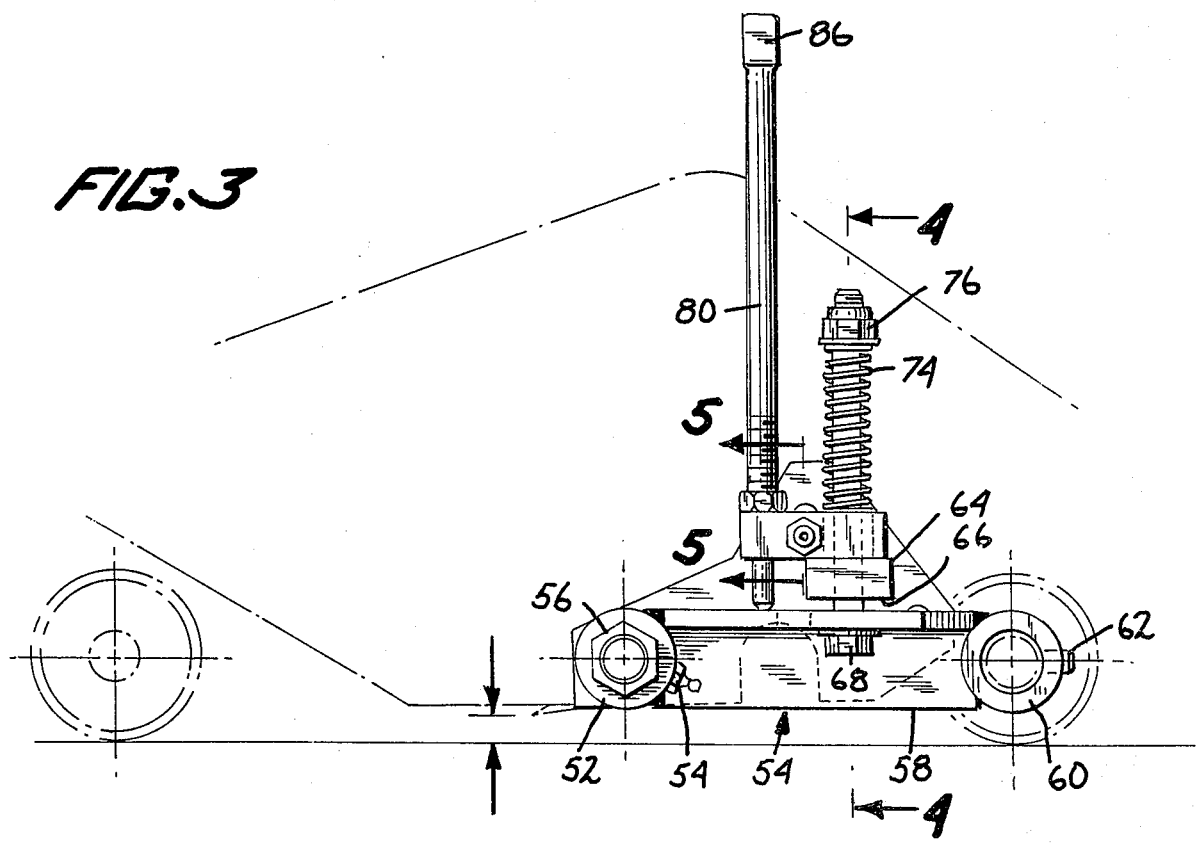
FIG. 3 is an elevational view of the mechanism of FIG. 2 with the height-of-cut adjustment mechanism shifted into a second height-of-cut position.

From a review of FIGS. 2 and 3, it will be seen that pivotal movement of pivot arms means 50 about the axis defined by pivot pin 46 will swing the associated ground-engaging roller about an arc which will effectively lower or raise the position of the reel assembly bed knife above a ground surface. The ground surface is represented in FIGS. 2 and 3 as a horizontal line and the height of the bed knife above that horizontal line is shown by arrows in each figure.

Mounting plate 44 has stop means rigidly fastened to it. In the specific embodiment pictured the stop means takes the form of a rectangular block 64 welded to a mounting plate 44. The lower surface 66 of block 64 acts as a stop surface to limit upward pivotal movement of pivot arm means 50. This defines the lower height-of-cut position as shown in FIG. 2.

Extending through a clearance hole in right angle portion 58 is a cap screw 68. Cap screw 68 bears against the undersurface of portion 58 through a washer 70 and extends through clearance holes in block 64 and in a pivot block 72. Cap screw 68 carries a compression spring 74 which is captivated between an upper surface of pivot block 72 and a lock nut 76. The spring biasing force exerted against pivot block 72 and pivot arm means 50 by spring 74 may be controlled by adjustment of lock nut 76. However, it will be understood that the compression spring 74 exerts a force which spring biases pivot arm means 50 upwards toward contact with the stop surface.

Pivot block 72, in conjunction with an associated trigger arm 80 which is threaded through a portion of pivot block 72, operate as a trigger means and provide a second stop surface for a second position of height-of-cut adjustment. The mechanism is shown in this second higher height-of-cut adjustment position in FIG. 3. Trigger arm 80 is adjustably mounted on the pivot block 72 by means of its threaded engagement with the pivot block and use of a jam nut 82. One end of trigger arm 80 is a protrusion through pivot block 72 and terminates in a stop surface 84. The opposite end is a flat used for manual triggering into the lower height-of-cut position shown in FIG. 2.

Figures 4, 5, 6:
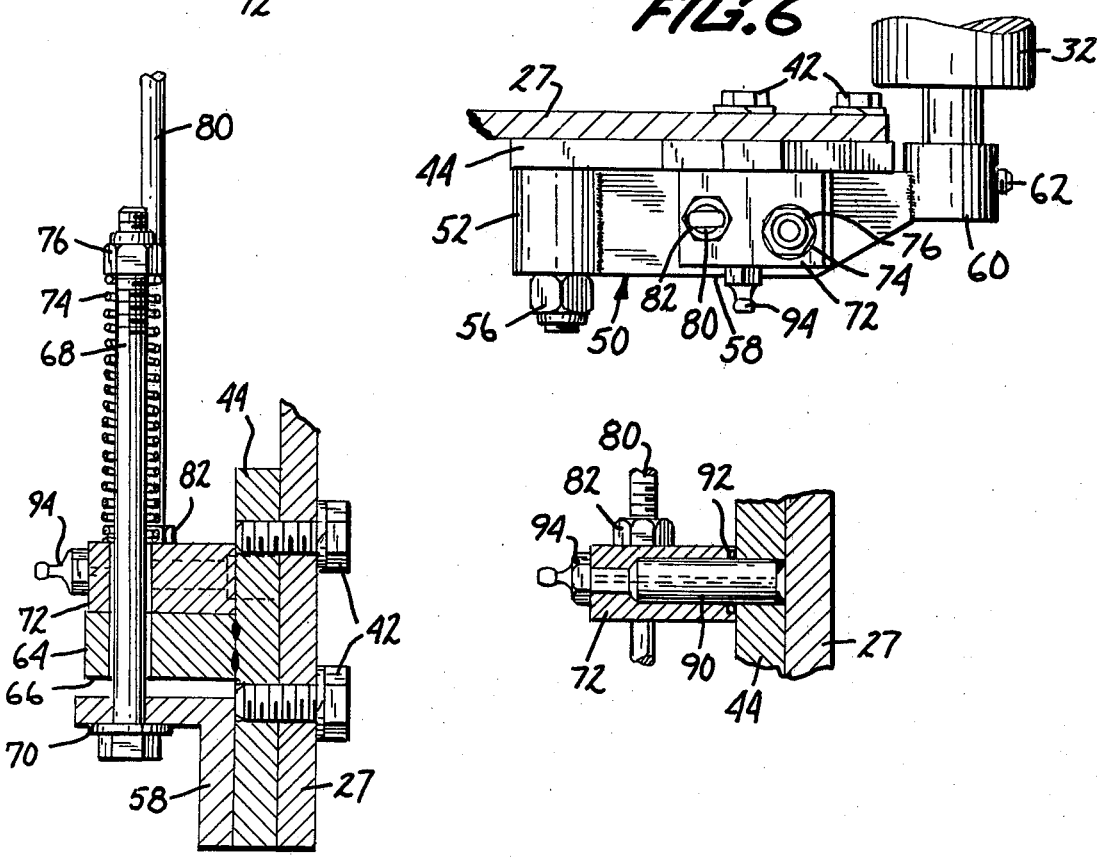
FIG. 4 is a sectional view, portions thereof being broken away, of the apparatus shown in FIG. 3 taken along the line 4—4 thereof.
FIG. 5 is a sectional view of a portion of the apparatus shown in FIG. 3 taken along the line 5—5 thereof to show the detail of the pivot block.
FIG. 6 is a plan view of the height-of-cut mechanism of FIGS. 2 and 3 with portions of the associated reel assembly broken away.

Trigger arm 80 and associated pivot block 72 pivot about an axis defined by a pivot pin 90 as shown particularly in the sectional view of FIG. 5. Pivot block 72 has a hole bored therein to receive the pivot pin which extends generally horizontally outward from mounting plate 44 and may be welded thereto. Pivot block 72 may carry an O-ring 92 to provide a sealed bearing surface and may have a grease fitting 94 to allow lubrication of the triggering means.

It should be understood that compression spring 74 constantly urges pivot block 72 in a direction to cause upward movement of trigger arm 80 and stop surface 84 thereof. Such upward rotational movement about the axis of pin 90 is limited by contact between block 72 and the upper surface of stop block 64.

As shown in a cut-away view of right angle portion 58 in FIG. 2, and in dotted line form in FIG. 3, right angle portion 58 has a relief hole or slot 96 therein which acts as a latch for the trigger means and allows the rear ground-engaging roller to assume the low height-of-cut position shown in FIG. 2. While a number of alternative latches could be used to place the trigger means in a position in which stop surface 84 would not be engaged by a surface on pivot arm means 50, relief hole 96 provides a convenient and inexpensive dual function structure for this purpose.

The operation of the mechanism may be best understood by reference to FIGS. 2 and 3. FIG. 2 shows the height-of-cut adjustment mechanism in a low height-of-cut position, such as that to be used in mowing a golf course green surface. In that position, compression spring 74 is biasing the right angle portion 58 of pivot arm means 50 into contact with stop surface 66. This provides a reliable, repeatable lower height-of-cut setting for the mechanism. The wear in the mechanism is taken up by the compression spring 74. In addition, when reel assemblies 12, 14, 16 are lifted from ground-engagement, spring 74 acts to bias the pivot arms of the associated reel assemblies into continual contact with the stop means and thus lessens wear which might otherwise occur. While compression spring 74 is also attempting to bias trigger arm 80 forward and upward, this is prevented by contact between the front edge of relief hole 96 and a protruding portion of trigger arm 80.

If it is desired to bring the mechanism into the second higher height-of-cut position as shown in FIG. 3, all that is necessary is to raise the reel assemblies by means of lift bails 26 and the associated lift arms 24 then to exert a downward force on the rear ground-engaging rollers. The downward force causes trigger arm 80 to lose contact with the relief hole 96 and it therefore springs forward to the position shown in FIG. 3 with the bottom surface of pivot block 72 in contact with the top surface of stop block 64. When pressure on the ground-engaging roller is released, compression spring 74 upwardly biases it against the contact surface 84 and establishes the second height-of-cut position. This height-of-cut position is adjustable by means of a jam nut 82 and the threaded engagement between trigger arm 80 and the pivot block 72. In such a position, the compression spring 74 biases the trigger arm into the first higher height-of-cut position for use in cutting the collar portions around the green. Since the normal difference in height-of-cut for these two portions is one-quarter to one-half inch, this height-of-cut adjustment mechansim is capable of providing ample adjustment.

In order to trigger the height-of-cut mechanism back into the lower green mowing height-of-cut position, all that is necessary is to manually flip the trigger arms forward while holding flat portions 86 of the trigger arm until contact surface 84 and the protrusion of trigger arm 80 engages relief hole 96. Compression spring 74 then lifts pivot arms 50 into contact with stop surface 66 and provides the latching force to hold the triggering mechanism into the position originally shown in FIG. 2.

From the above description, it is apparent that there has been provided, in accordance with the invention, a height-of-cut adjustment mechanism for use in precision grass mowers which fully satisfies the aims, advantages and other features set forth above. While the invention has been described in conjunction with specific embodiments thereof, it will be evident that many alternatives, modifications, and variations will be apparent to those skilled in the art in the light of the foregoing description. For example, the trigger arm which provides a protrusion for a second stop surface might be constructed to be integral with a pivot block. Also, it is possible to use means other than a compression spring to a spring bias the trigger means and the pivot arm. Certainly, other alternatives will occur to those skilled in the art. Despite the disclosure of certain specific embodiments in the specification for purposes of a clearer illustration of application of the inventive concept to specific devices, it is intended to embrace all alternatives, modifications, and variations falling within the spirit and broad scope of the appended claims.

What is claimed is:

1. A height-of-cut adjustment mechanism for use with a lawn mowing machine having a cutting mechanism mounted in a frame to be supported above a ground surface by a pair of ground-engaging members, comprising:
  a. pivot arm means pivotally carried by said frame and providing a supportive connection between one of said members and said frame to permit pivoting of said member with respect to said frame;
  b. stop means carried by said frame above said pivot arm means and having a first stop surface thereon to limit pivotal movement of said pivot arm;
  c. trigger means having a second stop surface thereon, said trigger means being operable in a first position to position said second stop surface below said first stop surface for contact with said pivot arm means, and in a second position, movable to allow said pivot arm means to contact said first stop surface;
  d. spring means for urging said pivot arm means upward toward said stop means and urging said trigger means toward said first position; and
  e. latch means associated with said trigger means and pivot arm means for preventing said trigger means from being urged into said first position while said pivot arm means is in contact with said first stop surface.

2. The apparatus of claim 1 wherein said trigger means includes a pivotable member carrying said second stop surface, and said spring means includes a compression spring associated with said pivotable member and said pivot arm means to upwardly bias said pivot arm means and said second stop surface.

3. The apparatus of claim 2 wherein said spring means further includes spring mounting means extending through clearance holes in said pivot arm means, said stop means and said pivotable member and captivating said compression spring with one end thereof bearing against said pivotable member.

4. The apparatus of claim 3 wherein said spring mounting means includes an elongated screw extending through said clearance holes and generally axially of said compression spring and nut means captivating said compression spring between said pivotable member and said nut means.

5. The apparatus of claim 2 wherein said latch means comprises a clearance aperture in said pivot arm means which cooperates with said pivotable member to receive a protrusion thereon carrying said second stop surface and to latch said trigger means into said second position.

6. The apparatus of claim 5 wherein said trigger means further includes lever arm means for manual movement of said trigger means against the urging of said spring means from said first position to said second position.

7. The apparatus of claim 6 wherein said stop means is positioned below said pivotable member to limit pivotal movement of said pivotable member.

8. A two position height-of-cut adjustment mechanism for use with reel type mowing machines having a cutting reel mounted for rotation about a generally horizontal reel axis on a frame supported above a ground surface by a pair of circularly cylindrical rollers, comprising:
   a. a pivot arm, mounted on said frame for pivotal movement about a generally horizontal pivot axis, said pivot arm carrying means for mounting one of said rollers thereon and having a relief hole therein,
   b. stop means, rigidly fastened with respect to said frame above a portion of said pivot arm to limit upward pivotal movement thereof;
   c. a pivotable stop member, carrying a protrusion thereon and pivotally mounted on said frame for rotation about a generally horizontal axis above said stop member, said stop member being free to pivot with said protrusion extending below said stop means to further limit upward pivotal movement of said pivot arms;
   d. spring means cooperating with said pivot arm and said pivotable stop means to urge said pivot arm upwards and to pivot said pivotable stop member to urge said protrusion away from the relief hole in said pivot arm; and
   e. manual means for pivoting said pivotable stop member against the urging of said spring means to cause said protrusion to engage said relief hole and allow said pivot arm to contact said stop means.

9. The mechanism of claim 8 wherein said spring means comprises a compression spring mounted by means of an elongated screw member to exert biasing forces upon said pivotable stop member and said pivot arm.

10. The mechanism of claim 9 wherein said manual means includes a trigger arm functioning as a lever arm to allow manual pivoting of said pivotable stop member against the biasing of said spring means.

11. The mechanism of claim 10 wherein said trigger arm comprises an elongated rod member threadedly engaging said pivotable stop member and protruding downward therethrough to form said protrusion.

* * * * *